UNITED STATES PATENT OFFICE.

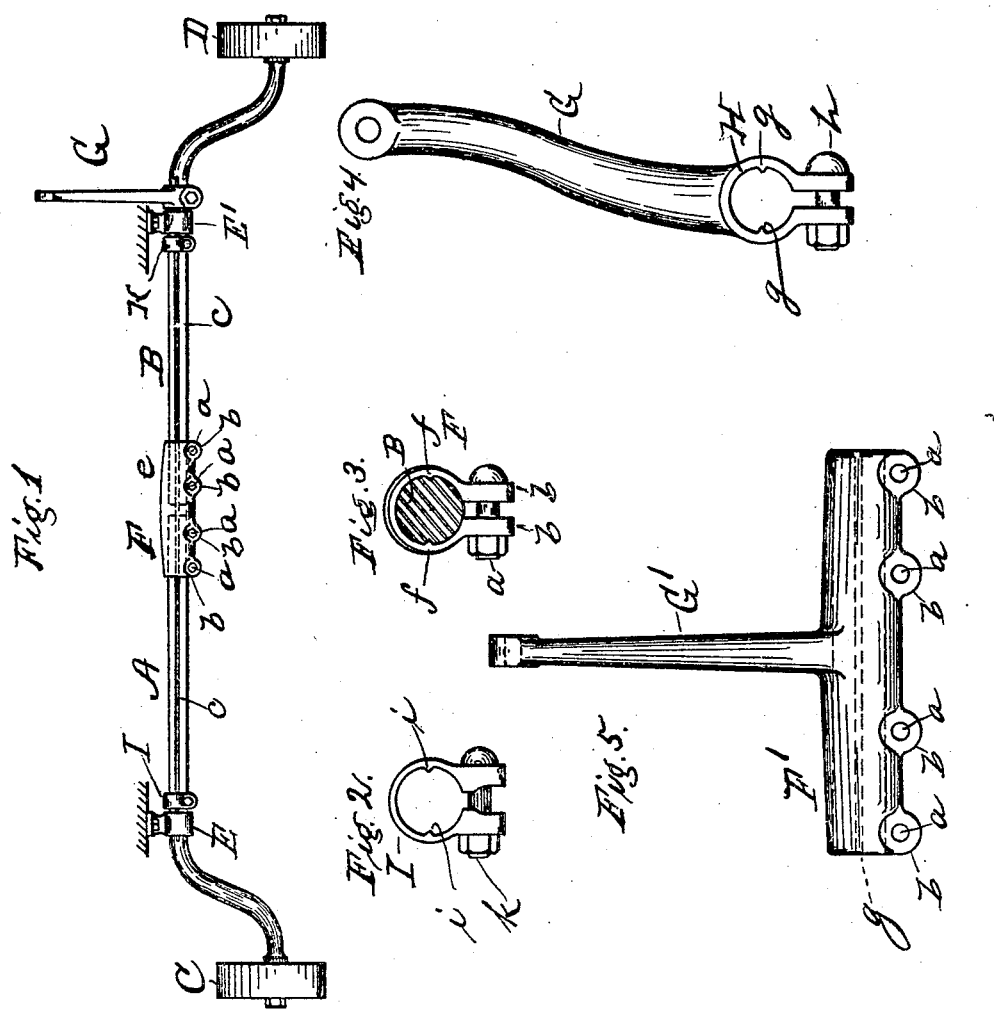

MORGAN POTTER, OF FISHKILL-ON-THE-HUDSON, NEW YORK, ASSIGNOR TO MORGAN POTTER COMPANY, OF FISHKILL-ON-THE-HUDSON, NEW YORK, A CORPORATION.

VEHICLE-BRAKE SHAFT.

No. 795,305.　　Specification of Letters Patent.　　Patented July 25, 1905.

Application filed February 24, 1905. Serial No. 247,074.

*To all whom it may concern:*

Be it known that I, MORGAN POTTER, a citizen of the United States, residing at Fishkill-on-the-Hudson, in the county of Dutchess and State of New York, have invented certain new and useful Improvements in Vehicle-Brake Shafts and Couplings, of which the following is a full, clear, and exact specification, reference being had to the accompanying drawings and to the letters of reference marked thereon.

My present invention relates more particularly to shafts and couplings intended for use in connection with the brakes of vehicles of various kinds, the shafts being preferably divided or composed of two or more parts for purposes which will be hereinafter referred to.

The principal object of my present invention is to provide a simple, safe, and reliable shaft for the brake-blocks of vehicles and means for coupling not only the adjacent ends of portions of this shaft but other parts necessary to be coupled thereon, rendering the coupled parts reversible if need be, and all this without interfering with the partial rotation of the shaft in the shaft-hangers.

Subordinate objects are to make the coupled pieces amply secure in the positions to which they may be adjusted without unduly increasing their size and permitting them to be applied at any desired points of the shaft.

To accomplish the above-named objects and to secure other and further advantages in the matters of construction, operation, and use, my improvements involve certain new and useful particular features of construction and relative arrangements or combinations of parts, as will be herein first fully described and then pointed out in the claims.

In the accompanying drawings, which form part of this specification, Figure 1 is a view in elevation of a brake-shaft for vehicles with brake-blocks and fittings in place thereon, the same being shown as if applied upon a vehicle and being constructed and arranged for operation in accordance with my invention, the brake-shaft lever being located on the brake-shaft outside of one of the hangers. Fig. 2 is a side elevation of one of the collars employed on the shaft to prevent longitudinal movement of the latter in the hangings or bearings. Fig. 3 is an end elevation of the coupling-piece by which the sections of the shaft may be united, omitting the brake-shaft lever, this view showing also a cross-section of the shaft. Fig. 4 is a side elevation of the brake-shaft lever shown in Fig. 1 and detached from the shaft and illustrating the means by which it is connected to the latter. Fig. 5 is an elevation of the coupling-piece for the shaft-sections, showing the same as supplied with a projecting brake-shaft lever in accordance with my invention.

In all the figures like letters of reference, wherever they occur, indicate corresponding parts.

The brake-shaft may be composed of any number of sections, but is preferably made of only two, as at A and B, these sections being arranged to be coupled together, so as to form practically one shaft. The brake-blocks C and D are to be applied on the ends of the improved shaft, as any other brake-blocks, and they may be of any desired form.

E and E' are the hangers or bearings, in which the shaft is mounted and in which it partially turns when the brake-blocks are brought into or out of use, the said hangers being suitably applied upon some fixed portion of the vehicle. It is important that the shaft be so made that it may be adjustable longitudinally in the hangers and so that its partial rotation therein, no matter to what points it may be adjusted, will not be interfered with.

F, Figs. 1 and 3, is a coupling by which two adjacent sections of the shaft may be united. This for cheapness of manufacture and ease of fitting is preferably made of cast malleable iron open at one portion throughout its length, and it is constructed to snugly fit the extremities of the adjacent ends of the divided shaft and to be pinched thereon by suitable bolts, as at $a\ a$, passing through the lips $b\ b$. The metal is sufficiently elastic, so that when the nuts on the bolts $a\ a$ are loosened the lips $b\ b$ will spring apart, and thus loosen the grasp of the coupling upon the extremities of the shaft, so that these extremities may be moved out or in within the hangers to bring the brake-blocks or either of them to the desired location. When this adjustment is effected as may be desired, the coupling is pinched up by the bolts and is thus made to hold the two adjacent ends of the shaft-sections with the same security and rigidity as if the shaft was in one piece and not adjustable with respect to its length, as has heretofore been the ordinary custom of making these brake-shafts.

To compel the two parts of the shaft to turn together and to operate the same as if of one piece, the straight portions of the shaft are grooved or channeled out longitudinally on each side, as at $c\ c$, and these grooves are located diametrically opposite each other, so that when the open portion of the coupling is turned either up or down the coupling will receive the ends of the shaft with equal facility and hold them together with equal security. The grooves or channels may be made in any suitable way, as by milling or cutting or rolling.

The coupling F is supplied on its interior with suitable longitudinal ribs or projections $f\ f$ on each side, these projections being made to enter the grooves or channels above referred to. The coupling preferably has the ribs or projections cast with it, so that when it comes from the mold it is ready for application except for the perforations necessary to be made to receive the bolts $a$. Obviously this coupling might be made by other methods except casting; but these would be more expensive.

It is desirable that the coupling should be as light as is consistent with its necessary strength and durability, and for this reason the material between the series of lips $b$ is preferably recessed or cut away, as shown in Figs. 1 and 5.

If the coupling, made light, as above explained, was of equal thickness throughout its length, then as the extremities of the shaft within it are moved farther and farther apart the strain upon the shaft might break the coupling. To provide against this, I make the central part of the coupling a little thicker than the extremity, as indicated at $e$. This slight swell $e$ may be extended all around the coupling, if desired; but ordinarily it will be found sufficient if extended only over the part opposite the lips $b$, for the part containing the lips if strong enough to withstand the pinching of the bolts will not be liable to be broken by any strain upon the brake-shaft. The coupling is thus thickened in the middle and reduced at the ends. The employment of the ribs or projections $f\ f$ on the interior of the coupling-piece add to its strength and do not increase its exterior size.

G represents a lever by which the brake-shaft may be moved to bring the brake-blocks into contact with the wheels or to carry them out of such contact. This lever, being applied on the shaft, when it is moved of course the shaft is turned in its bearings, the two parts of the shaft being similarly turned when they are securely coupled, as above described.

The security of the union between the brake-shaft lever and the brake-shaft is of course important, and it is desirable that it should be of such form that the lever may be set in place for use at any desired point. Therefore I supply the lower portion of the lever when made separate from the coupling-piece with a collar in cross-section somewhat similar to the coupling-piece F. This collar is represented at H, and it is supplied with oppositely-located interior ribs or projections $g\ g$ and with a coupling-bolt $h$. The ribs or projections $g$ enter the grooves or channels $c$ in the shaft, and the bolt $h$ being tightened the grip of the lever on the shaft is made perfectly rigid. This lever may by this means be coupled with the shaft at any desired point.

In some instances it is desirable that the brake-shaft lever be located near the central part of the shaft or central part of the vehicle, and in such cases I form the lever (represented at G', Fig. 5) integrally with the coupling-piece F' or secure these parts in some substantial manner. The coupling-piece F' and lever G' are of the same general construction and have the same capacities as their separate counterparts F and G and enable me to couple the shaft-sections and at the same time locate the brake-shaft lever at the part occupied by the coupling-piece. The coupling-piece, carrying the brake-shaft lever, is supplied with interior ribs, or projections $g$ and coupling-bolts $a$, same as in the form without the applied lever.

The bearing of the blocks against the wheels of the vehicle causes the blocks to wear, and sometimes they wear to one side more than to the other, and it becomes necessary to adjust them so that they will bear more properly against the tires. Again, in use the dish of the vehicle-wheels will change or is sometimes changed by resetting the tires, &c., making it necessary and desirable to sometimes adjust the blocks. This adjustment is easily and quickly effected by loosening the bolts $a$ and at the same time loosening the collars, which are also applied on the shaft. Then the parts of the shaft may be moved in or out in their hangers to bring the brake-blocks to the proper lines, after which the bolts in the coupling-piece F or F' are tightened up and the collars readjusted against their adjacent hangers and there tightened in place. When the collars are locked in proper place on the shaft and against the sides of the hangers, it is apparent that the coupled shaft cannot move in the hangers toward one side or the other, and thus the shaft is maintained in working position precisely as if it was solid or of a single piece.

The two collars are represented at I and K in Fig. 1. They are both alike, and they are constructed as shown in Fig. 2—that is, they have interior ribs or projections $i\ i$, arranged longitudinally and on each side of the interior of the collar and calculated to fit in the grooves $c$ in the shaft. The collars are also each supplied with a suitable coupling-bolt, (represented at $k$,) by which bolt they may be tightened in place. When once in place against the hangers and properly tightened, they will insure the maintenance of the brake-blocks in the proper lines to which they have been adjusted.

In many cases it is desirable to turn the coupling or the collars on the shaft, so that the tightening-bolts will normally lie on the upper side of the shaft instead of on the lower, as indicated in the figures. In some cases this location or arrangement is impossible, owing to the formation of the vehicle-body or owing to some obstruction being located in the path of the coupling or the collars as they turn with the brake-shaft, and in such cases the coupling-bolts are located on the under side of the shaft. The reversal of the coupling and of the collars upon the two parts of the shaft is not only possible, but easy and convenient, owing to the location of the grooves or channels at diametrically opposite positions on the shaft-sections, as above explained. The coupling may as easily be put in place one side up as the other, and in either position it will pinch and hold the shaft-sections with equal accuracy and security. The duplicate grooves or channels supply a double security against the twisting or yielding of the shaft-sections one with respect to the other and the yielding of the brake-shaft lever with respect to the shaft, and thus the coupling of the parts is more secure than it would be with single grooves or channels. Besides, with single grooves or channels the coupling-piece and the collars could not be reversed upon the shaft-sections as they can when constructed in accordance with my invention. With this form of construction also the shaft and the parts to be coupled thereon need not be made to fit each other accurately, as is necessary when ordinary set-screws are employed, for any variation in size of the parts is compensated for by tightening the various coupling-bolts.

In the ordinary forms of coupling employed for power-shafts there is no necessity for reversing the coupling on the shaft, for the latter revolves completely and continuously in its bearings, and therefore a single key or spline is found sufficient in such couplings. In a brake-shaft for vehicles, however, the shaft never makes a complete revolution in its bearings, but only a partial revolution, depending in extent upon the extent of movements of the brake-shaft lever, after which the shaft is allowed to return to its normal position.

While I have represented the brake-shaft as being supplied with a single coupling-piece between the two hangers, two or more of such coupling-pieces may be utilized in connection with the shaft when the latter is divided at two or more points.

By use of the grooves in the shaft its exterior is left practically cylindrical and free from any projections which would interfere with the turning of the shaft in its bearings.

The improved brake-shaft and couplings, being constructed and arranged for operation substantially as above explained, will be found to admirably answer all the purposes or objects of the invention hereinbefore set forth and to afford obvious facilities in the matters of adjusting, locating, and holding the brake-blocks in proper working position and insuring the unyielding connection of the brake-shaft lever with its shaft.

Having now fully described my invention, what I claim as new herein, and desire to secure by Letters Patent, is—

1. The herein-described divided brake-shaft for vehicle-brakes, the same being supplied with longitudinal grooves located one on each side and diametrically opposite each other and adapted to receive the fittings and to be withdrawn therefrom, substantially in the manner and for the purposes set forth.

2. In combination with a divided brake-shaft for vehicle-brakes, a coupling-piece for uniting the parts, the two parts of the shaft being each supplied with longitudinal grooves on opposite sides and the coupling-piece having interior ribs adapted to fit said grooves and being adjustable on the shaft, substantially as shown and described.

3. In combination with a coupling-piece for the sections of a divided brake-shaft, a brake-shaft lever applied in connection with said coupling-piece, the latter being supplied with interior longitudinal ribs and with coupling-bolts, and the shaft being provided with longitudinal grooves on opposite sides, substantially as and for the purposes set forth.

4. In combination with a brake-shaft for vehicle-brakes having longitudinal grooves on opposite sides, a collar for said shaft, said collar being adjustable on the shaft and removable therefrom and being supplied with interior ribs adapted to fit the longitudinal grooves in the shaft, and means for pinching the collar in place, substantially as set forth.

5. In combination with a brake-shaft for vehicle-brakes having longitudinal grooves located on opposite sides, a brake-shaft lever having a collar with interior ribs adapted to fit said grooves, and means for pinching the said collar in place upon the shaft, the collar being adjustable on the shaft and removable therefrom, substantially as set forth.

6. In combination with a brake-shaft for vehicle-brakes having longitudinal grooves located on opposite sides, hangers or bearings in which the shaft may turn and from which it may be withdrawn, slidable collars for the shaft having interior ribs, and a brake-shaft lever having a collar with interior ribs, the parts being constructed and arranged for application and adjustment, substantially as explained.

7. In combination with a divided brake-shaft for vehicle-brakes, a coupling for the adjacent parts of the shaft, the shaft being grooved as explained and arranged to be withdrawn from the fittings and the coupling-piece being supplied with interior ribs to fit the grooves and being enlarged at its central part, and means for securing the coupling, substantially as and for the purposes explained.

In testimony whereof I have signed my name to this specification in the presence of two subscribing witnesses.

MORGAN POTTER.

Witnesses:
   C. SEDGWICK,
   WORTH OSGOOD.